United States Patent
Chae et al.

(10) Patent No.: US 11,357,045 B2
(45) Date of Patent: Jun. 7, 2022

(54) METHOD AND APPARATUS FOR SELECTING RESOURCE AND TRANSMITTING PSSCH IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/337,343

(22) PCT Filed: Sep. 28, 2017

(86) PCT No.: PCT/KR2017/010837
§ 371 (c)(1),
(2) Date: Mar. 27, 2019

(87) PCT Pub. No.: WO2018/062898
PCT Pub. Date: Apr. 5, 2018

(65) Prior Publication Data
US 2020/0037358 A1    Jan. 30, 2020

Related U.S. Application Data

(60) Provisional application No. 62/416,137, filed on Nov. 1, 2016, provisional application No. 62/406,938, filed
(Continued)

(51) Int. Cl.
*H04W 74/08*    (2009.01)
*H04W 4/70*    (2018.01)
(Continued)

(52) U.S. Cl.
CPC .......... *H04W 74/0808* (2013.01); *H04W 4/70* (2018.02); *H04W 72/0446* (2013.01); *H04W 74/002* (2013.01); *H04W 92/18* (2013.01)

(58) Field of Classification Search
CPC ... H04W 4/70; H04W 72/02; H04W 72/0446; H04W 74/00; H04W 74/002; H04W 74/08; H04W 74/0808; H04W 92/18
See application file for complete search history.

(56) References Cited

U.S. PATENT DOCUMENTS 10,057,076 B2 *   8/2018   Sartori ............... H04W 72/085
2015/0334721 A1 * 11/2015   Kim ...................... H04W 72/02
370/330
(Continued)

FOREIGN PATENT DOCUMENTS

| JP | 2012-059010 A | 3/2012 |
| KR | 1020160140649 A | 9/2016 |
| WO | 2015115847 A1 | 8/2015 |

OTHER PUBLICATIONS

Ericsson, "Discussion on P2x-x2P", 3GPP TSG RAN WG1 Meeting #85, May 23-27, 2016, R1-165275.
(Continued)

*Primary Examiner* — Khaled M Kassim
(74) *Attorney, Agent, or Firm* — Dentons US LLP

(57) ABSTRACT

One embodiment of the present invention is a method for user equipment transmitting a physical sidelink shared channel (PSSCH) in a wireless communication system, the method for transmitting a PSSCH comprising the steps of: performing sensing on an m number of subframes indicated by upper layer signaling from among an n number of subframes in a sensing window; repeating sensing of the m number of subframes at an interval of the n number of subframes within the sensing window; selecting, as a transmission resource, the m number of subframes from among
(Continued)

the n number of subframes within a selection window, on the basis of the result of sensing the m number of subframes; and transmitting the PSSCH through the m number of subframes selected as the transmission resource.

14 Claims, 10 Drawing Sheets

Related U.S. Application Data on Oct. 11, 2016, provisional application No. 62/403,056, filed on Sep. 30, 2016, provisional application No. 62/401,162, filed on Sep. 28, 2016.

(51) Int. Cl.
*H04W 72/04* (2009.01)
*H04W 74/00* (2009.01)
*H04W 92/18* (2009.01)

(56) References Cited

U.S. PATENT DOCUMENTS

| | | |
|---|---|---|
| 2015/0334760 A1 | 11/2015 | Sartori et al. |
| 2017/0188391 A1* | 6/2017 | Rajagopal ......... H04W 74/0816 |
| 2018/0098322 A1* | 4/2018 | Yoon ................. H04W 56/0005 |
| 2018/0279094 A1* | 9/2018 | Blasco Serrano .... H04W 72/04 |
| 2019/0132818 A1* | 5/2019 | Yasukawa ......... H04W 74/0816 |
| 2019/0182840 A1* | 6/2019 | Feng ....................... H04W 4/44 |
| 2020/0107297 A1* | 4/2020 | Wang ................... H04W 92/18 |

OTHER PUBLICATIONS

R1-167886: 3GPP TSG RAN WG1 Meeting #86, Gothenburg, Sweden, Aug. 22-26, 2016, NTT DOCOMO, Inc., "Evaluation and discussion on resource selection for pedestrian UEs," pp. 1-6.
R1-167869: 3GPP TSG-RAN WG1 #86, Gothenburg, Sweden Aug. 22-26, 2016, "Sequans Communications, Discussion on sensing operation for P-UE," pp. 1-6.
R1-166205: 3GPP TSG RAN WG1 Meeting #86, Gothenburg, Sweden, Aug. 22-26, 2016, Huawei, HiSilicon, "Discussion on the P-UE resource selection," pp. 1-4.
Ericsson: "Discussion on P2x", R1-166965, 3GPP TSG RAN WG1 Meeting #86, Gothenburg, Sweden, Aug. 22-26, 2016.
Huawei: "Discussion on sensing details for measurement and reservation", R1-164102, 3GPP TSG RAN WG1 Meeting #85, Nanjing, China, May 23-27, 2016.
NTT DOCOMO, Inc.: "Overview of LTE Radio Interface and Radio Network Architecture for High Speed, High Capacity and Low Latency", Technology Reports, vol. 19, No. 1, 2010, pp. 11-19.
Sharp: "Power Efficient Sensing for V2X Pedestrian UEs", R1-167609, 3GPP TSG RAN WG1 Meeting #86, Gothenburg, Sweden, Aug. 22-26, 2016.
Oppo: "UE measurement based congestion control", R1-166616, 3GPP TSG RAN WG1 Meeting #86, Gothenburg, Sweden, Aug. 22-26, 2016.
Intel Corporation: "Metric and sidelink measurements for V2V congestion control", R1-166514, 3GPP TSG RAN WG1 Meeting #86, Gothenburg, Sweden, Aug. 22-26, 2016.
Huawei: "Discussion on the P-UE resource selection", R1-1608649, 3GPP TSG RAN WG1 Meeting #86bis, Lisbon, Portugal, Oct. 10-14, 2016.
Samsung: "Partial sensing for pedestrian UE", R1-1612391, 3GPP TSG RAN WG1 Meeting #87, Reno, USA, Nov. 14-18, 2016.
MCC Support, Final Report of 3GPP TSG RAN WG1 #84bis v1.0.0, 3GPP TSG RRAN WG1 Meeting #85, Nanjing, China, May 23-27, 2016, R1-165448.

* cited by examiner (a)

(b)

(a)

D2D signal transmission from a UE allocated with unit # 0

(b)

METHOD AND APPARATUS FOR SELECTING RESOURCE AND TRANSMITTING PSSCH IN WIRELESS COMMUNICATION SYSTEM

This application is a National Stage Application of International Application No. PCT/KR2017/010837, filed on Sep. 28, 2017, which claims the benefit of U.S. Provisional Application No. 62/401,162, filed on Sep. 28, 2016, U.S. Provisional Application No. 62/403,056, filed on Sep. 30, 2016, U.S. Provisional Application No. 62/406,938, filed on Oct. 11, 2016 and U.S. Provisional Application No. 62/416,137, filed on Nov. 1, 2016, all of which are hereby incorporated by reference in their entirety for all purposes as if fully set forth herein.

TECHNICAL FIELD

The following description relates to a wireless communication system, and more particularly, to a method and apparatus for selecting a resource and transmitting a physical sidelink shared channel (PSSCH) by a user equipment.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present invention is to provide a method for performing partial sensing and a method for selecting a resource and transmitting a PSSCH based on the partial sensing.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present invention, provided herein is a method for transmitting, by a user equipment (UE), a physical sidelink shared channel (PSSCH) in a wireless communication system, the method including performing sensing for m subframes indicated by higher layer signaling among n subframes in a sensing window, repeating the sensing for the m subframes in the sensing window at intervals of the n subframes, selecting m subframes from among n subframes in a selection window as transmission resources based on a result of the sensing for the m subframes, and transmitting the PSSCH through the m subframes selected as the transmission resources.

In another aspect of the present invention, provided herein is a user equipment (UE) for transmitting a physical sidelink shared channel (PSSCH) in a wireless communication system, the UE including a transmitter and a receiver, and a processor, wherein the processor is configured to perform sensing for m subframes indicated by higher layer signaling among n subframes in a sensing window, to repeat the sensing for the m subframes in the sensing window at intervals of the n subframes, to select m subframes from among n subframes in a selection window as transmission resources based on a result of the sensing for the m subframes, and to transmit the PSSCH through the m subframes selected as the transmission resources.

The higher layer signaling may indicate m corresponding to the number of the m subframes.

The result of the sensing for the m subframes or a result of measurement of an occupancy rate of the resources may be transmitted to a network for a UE that does not receive a sidelink signal.

The UE that does not receive the sidelink signal may receive, from the network, information which is based on the result of the sensing for the m subframes.

The UE that does not receive the sidelink signal may determine a PSSCH transmission-related parameter based on the information received from the network.

The UE may be a pedestrian UE (P-UE).

The selection window may continuously start at an end of the sensing window.

Advantageous Effects

According to embodiments of the present invention, a P-UE may perform V2X communication while saving battery through efficient partial sensing.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings.

BEST MODE

Figure 1:
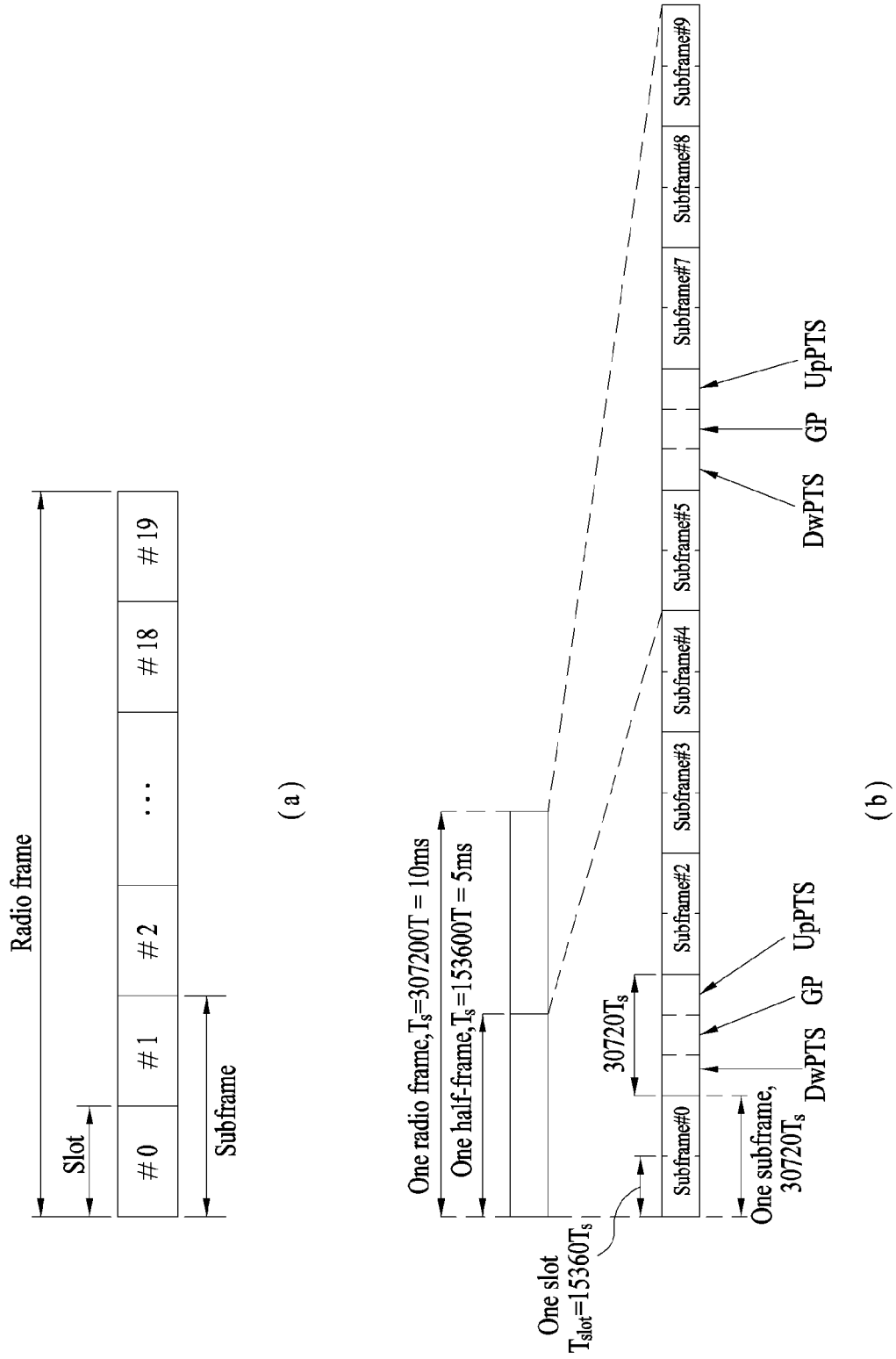
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
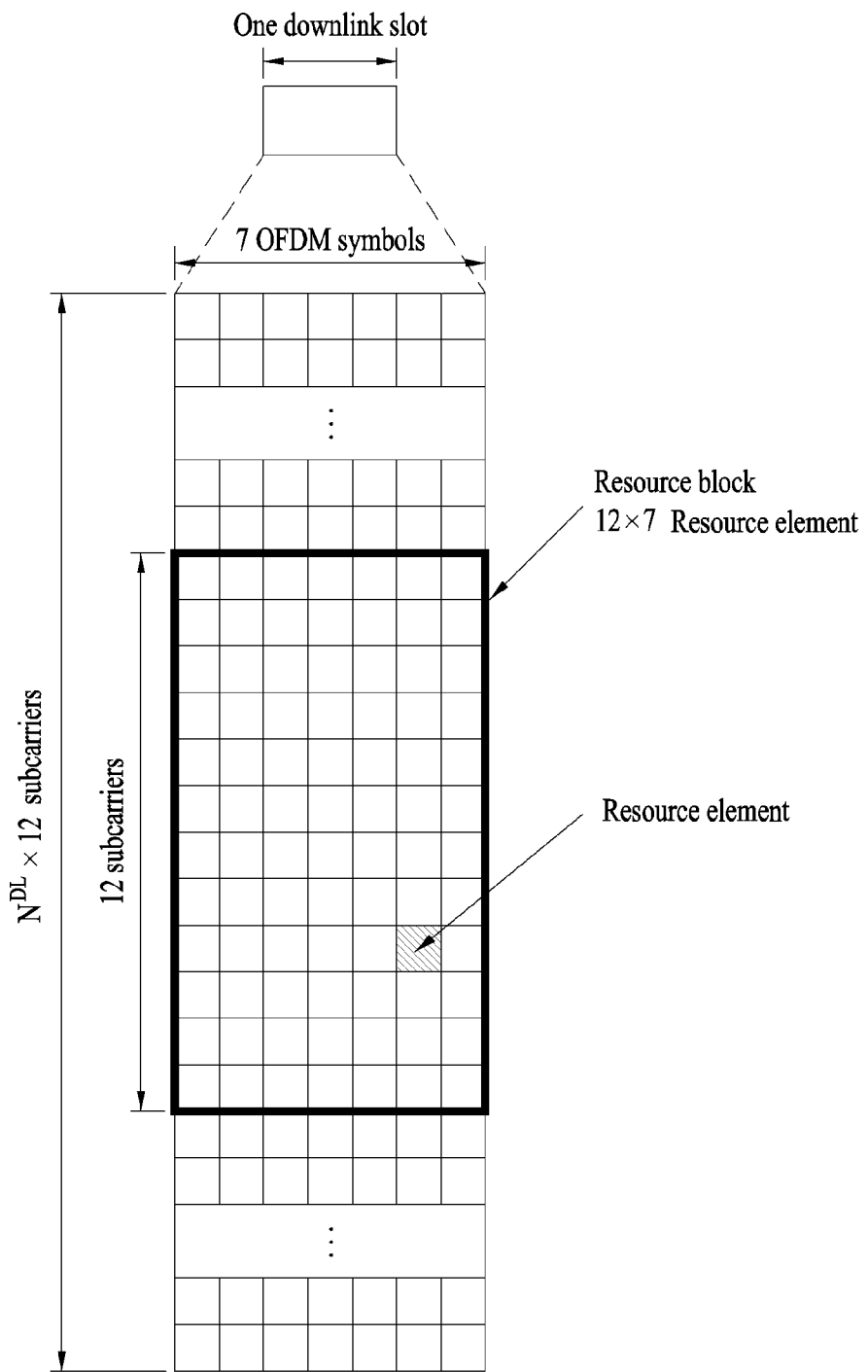
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
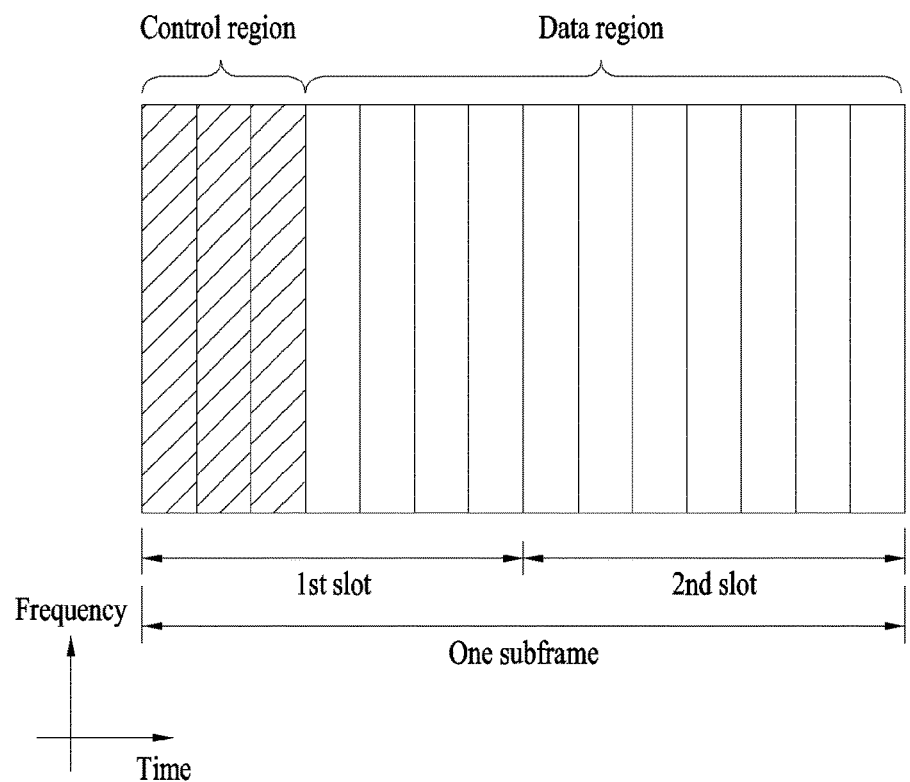
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
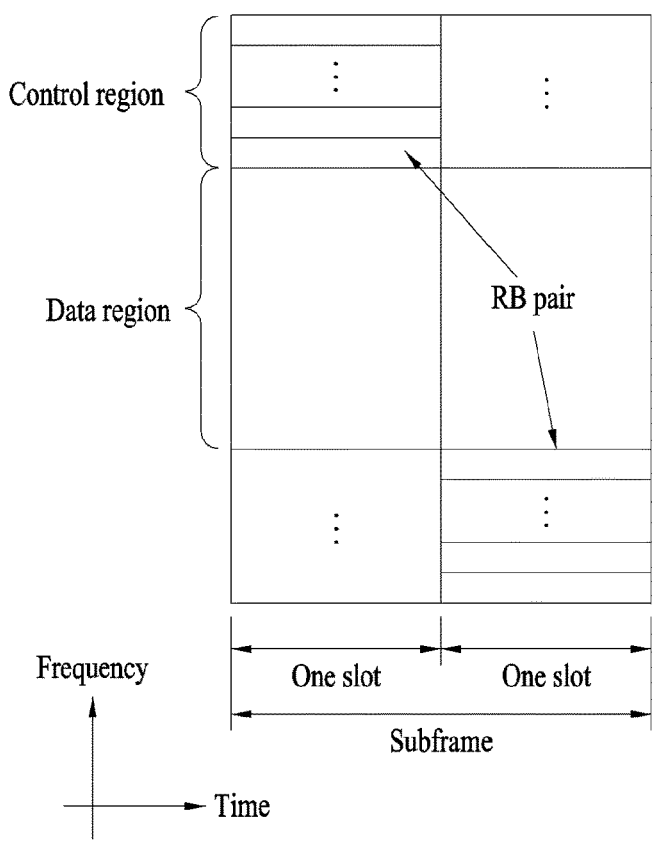
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
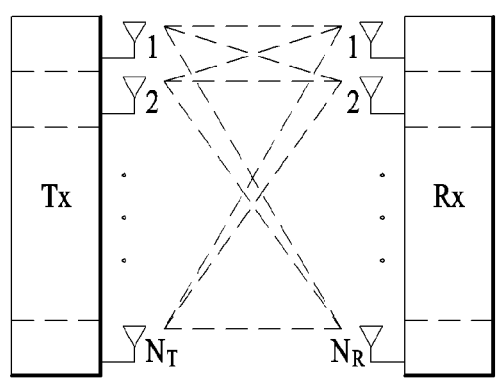
FIG. 5 is a view illustrating the configuration of a wireless communication system having multiple antennas.
Figure 5:
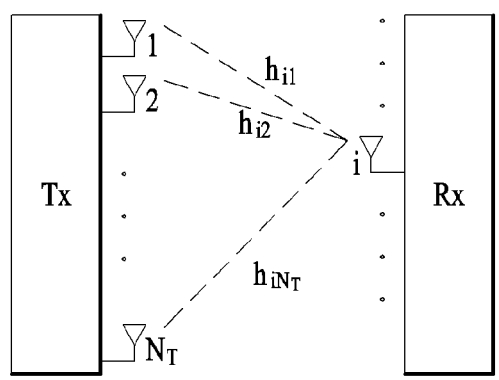

FIG. 5 is a diagram illustrating a configuration of a wireless communication system having multiple antennas.

As shown in FIG. 5(a), if the number of Tx antennas is increased to NT and the number of Rx antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{Equation 1}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{Equation 2}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{Equation 6}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{Equation 7}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the $N_R$ Rx antennas can be expressed as follows.

$$n = [n_1, n_2, \ldots, n_{N_R}]^T \quad \text{Equation 9}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{Equation 11}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
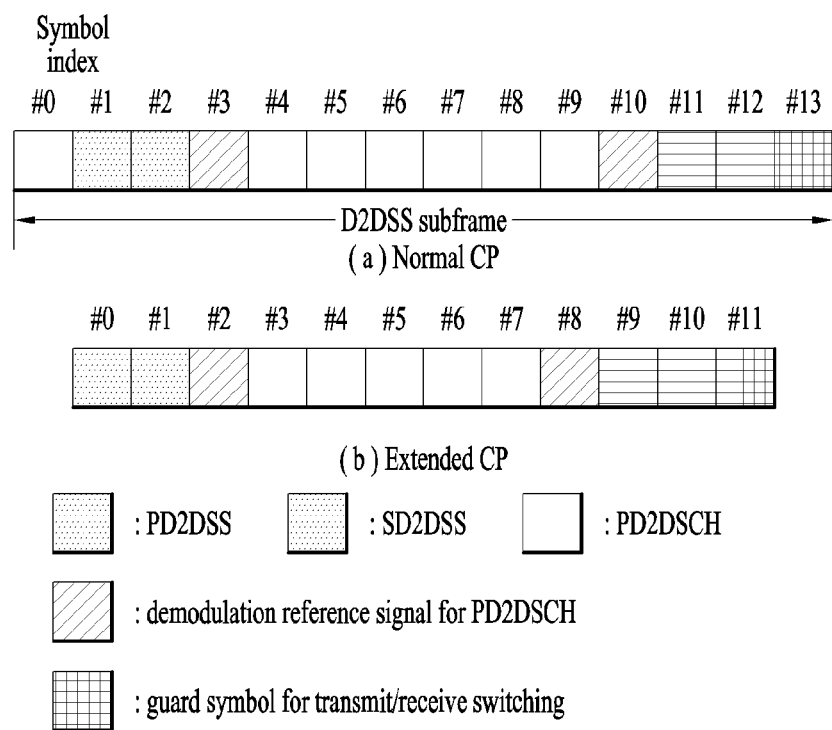
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
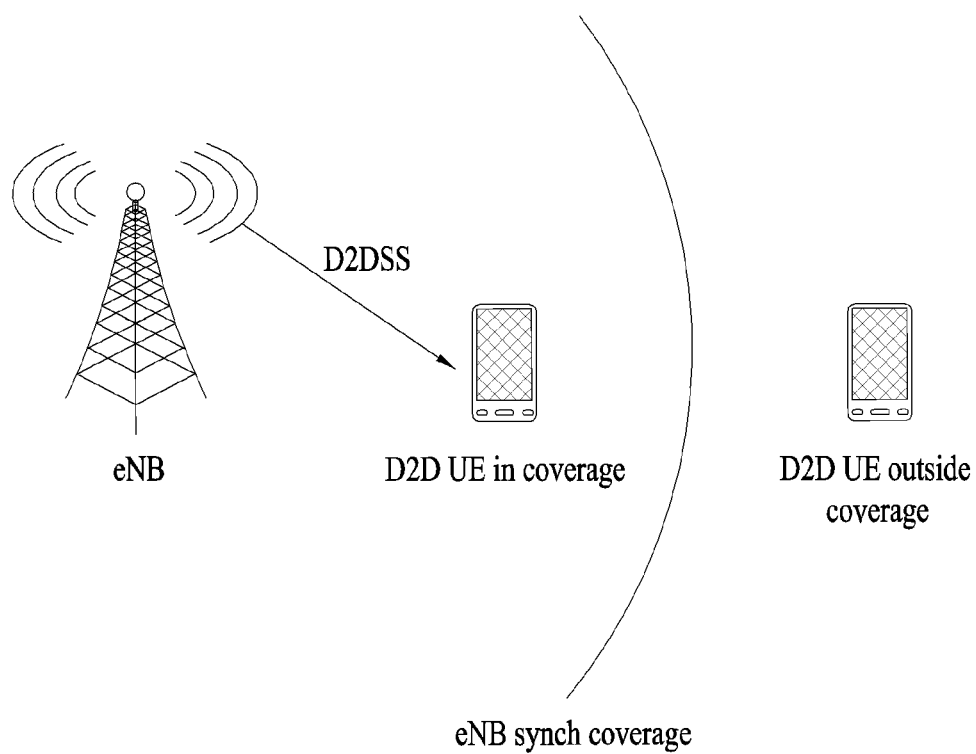
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
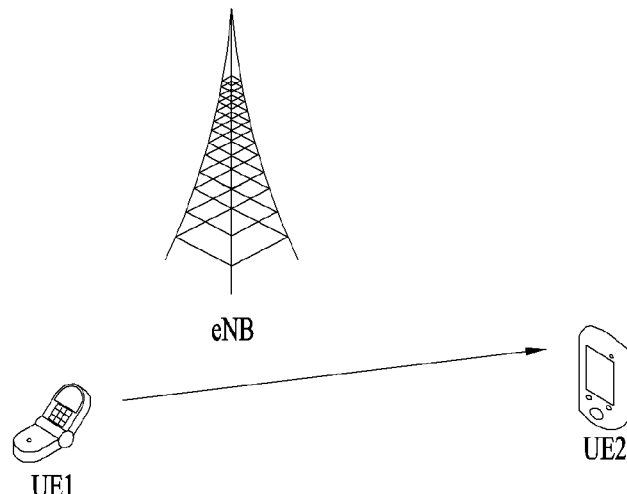
FIG. 8 is a view illustrating an exemplary D2D resource pool for D2D communication.
Figure 8:
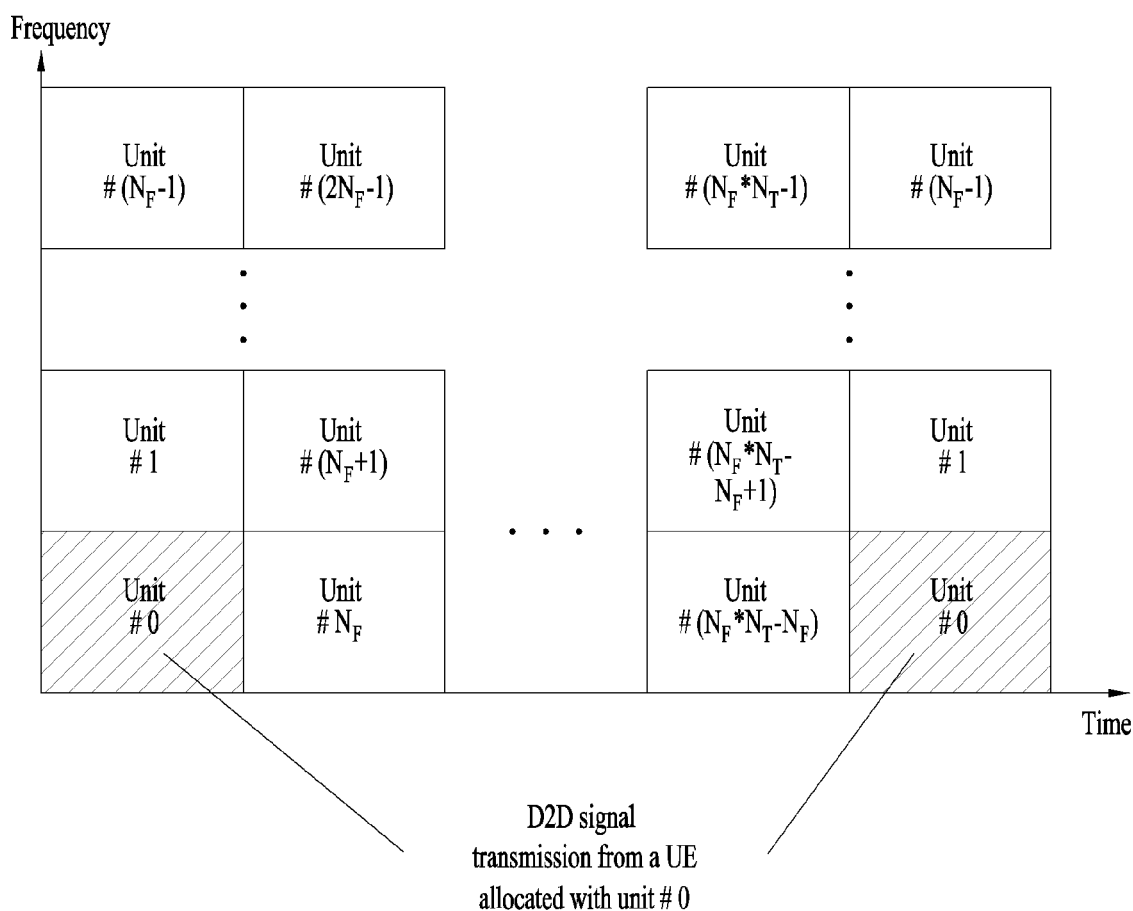

FIG. 8 shows an example of a first UE (UE1), a second UE (UE2) and a resource pool used by UE1 and UE2 performing D2D communication. In FIG. 8(a), a UE corresponds to a terminal or a network device such as an eNB transmitting and receiving a signal according to a D2D communication scheme. A UE may select a resource unit corresponding to a specific resource from a resource pool corresponding to a set of resources and transmit a D2D signal using the selected resource unit. UE2, a receiving UE, may receive a configuration of a resource pool in which UE1 may transmit a signal and detect a signal of UE1 in the resource pool. In this case, if UE1 is located within the coverage of an eNB, the eNB may inform UE1 of the resource pool. If UE1 is located outside the coverage of the eNB, the resource pool may be signaled by another UE or may be determined as a predetermined resource. In general, a resource pool may include a plurality of resource units, and a UE may select one or more resource units from among the plurality of resource units and use the selected resource unit(s) for D2D signal transmission. FIG. 8(b) shows an example of resource units. Referring to FIG. 8(b), the entire frequency resources are divided into $N_F$ resource units and the entire time resources are divided into $N_T$ resource units. Thus, $N_F*N_T$ resource units may be defined in total. This may be a case where a resource pool is repeated with a periodicity of $N_T$ subframes. In particular, as shown in FIG. 8, one resource unit may periodically and repeatedly appear. Alternatively, an index of a physical resource unit to which a logical resource unit is mapped may change in a predetermined pattern over time to obtain a diversity gain in the time domain and/or frequency domain. In this resource unit structure, a resource pool may refer to a set of resource units that may be used by a UE intending to transmit a D2D signal.

Resource pools may be subdivided into different types. The resource pools may be distinguished according to the contents of the D2D signal transmitted in each resource pool. For example, the contents of the D2D signal may be distinguished, and a separate resource pool may be configured for each content item. The contents of the D2D signal may include scheduling assignment (SA) (or a physical sidelink control channel (PSCCH)), a D2D data channel, and a discovery channel. The SA may be a signal including information such as the position of a resource used by a transmitting UE for transmission of a following D2D data channel, a modulation and coding scheme (MCS) or MIMO transmission scheme necessary for demodulation of the data channel, and a timing advance (TA). This signal may be multiplexed with D2D data on the same resource unit and transmitted. In this case, an SA resource pool may refer to a pool of resources on which the SA is multiplexed with the D2D data and transmitted. It may also be referred to as a D2D control channel or a physical sidelink control channel (PSCCH). The D2D data channel (or the physical sidelink shared channel (PSSCH)) may be a pool of resources used by the transmitting UE to transmit user data. If the SA is multiplexed with the D2D data and transmitted in the same resource unit, only the D2D data channel excluding the SA information may be transmitted in the resource pool for the D2D data channel. In other words, the REs used to transmit the SA information in the individual resource units in the SA resource pool may still be used to transmit the D2D data in the D2D data channel resource pool. The discovery channel may be a resource pool for a message through which the transmitting UE transmits information such as the ID thereof to allow a neighboring UE to discover the transmitting UE.

Even if the content of the D2D signal is the same, different resource pools may be used depending on the transmission/reception attribute of the D2D signal. For example, even if the same D2D data channel or discovery message is used, different resource pools may be used depending on the scheme of determination of the transmission timing of the D2D signal (for example, whether the signal is transmitted at the reception timing of a synchronization reference signal or transmitted by applying a certain TA to the reception timing), the resource assignment scheme (e.g., whether the eNB designates a transmission resource of an individual signal for an individual transmitting UE or whether an individual transmitting UE selects an individual signaling resource in a pool), a signal format (e.g., the number of symbols that each D2D signal occupies in one subframe or the number of subframes used for transmission of one D2D signal), the strength of a signal from the eNB, the transmit power intensity of the D2D UE, and the like. For simplicity, a scheme in which the eNB directly indicates a transmission resource of a D2D transmitting UE in D2D communication is referred as Mode 1, and a scheme in which a transmission resource region is preconfigured, or the eNB designates a transmission resource region and the UE directly selects a transmission resource is referred as Mode 2. For the D2D discovery, a scheme in which the eNB directly indicates a resource is referred to as Type 2, and a scheme in which the UE directly selects a transmission resource in a preconfigured resource region or a resource region indicated by the eNB is referred to as Type 1.

Transmission and Reception of SA

A Mode 1 UE may transmit an SA (or a D2D control signal or sidelink control information (SCI)) through a resource which is configured by the eNB. For a Mode 2 UE, resources to be used for D2D transmission are configured by the eNB. Then, the Mode 2 UE may select a time-frequency resource among the configured resources and transmit an SA.

Figure 9:
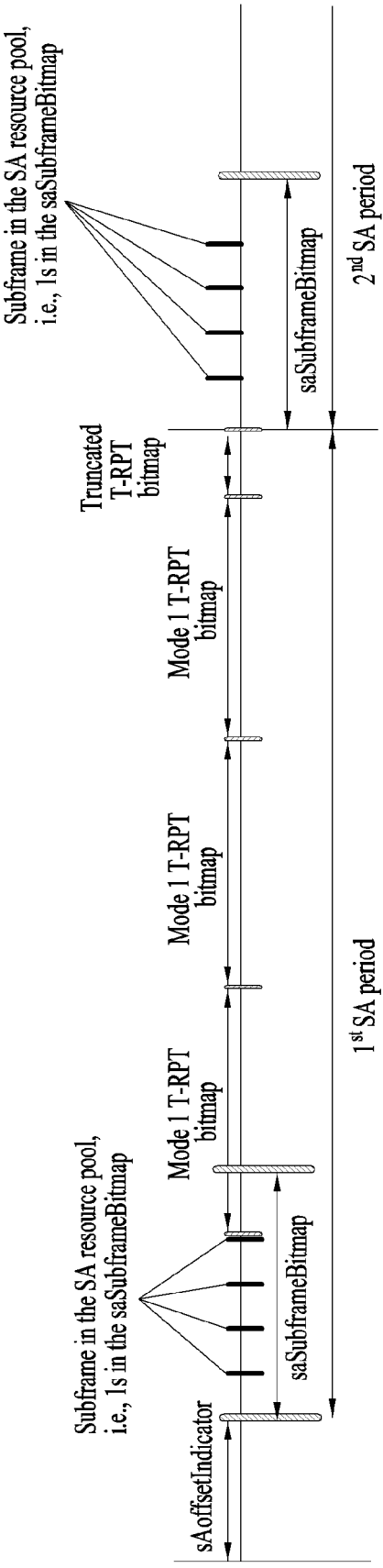
FIG. 9 is a view illustrating a scheduling assignment (SA) period.

The SA period may be defined as shown in FIG. 9. Referring to FIG. 9, the first SA period may start in a subframe separated from a specific system frame by a predetermined offset SAOffsetIndicator indicated by higher layer signaling. Each SA period may include an SA resource pool and a subframe pool for D2D data transmission. The SA resource pool may include subframes from the first subframe of the SA period to the last subframe among the subframes indicated as SA transmission subframes in a subframe bitmap saSubframeBitmap. In the Mode 1, a subframe to be actually used for data transmission in the resource pool for D2D data transmission may be determined by applying a time-resource pattern for transmission (T-RPT) (or time-resource pattern (TRP)). As shown in the figure, when the number of subframes included in the SA period except the SA resource pool is larger than the number of T-RPT bits, the T-RPT may be repeatedly applied, and the last applied T-RPT may be applied by being truncated by the number of remaining subframes. The transmitting UE performs transmission at a position in the indicated T-RPT for which the T-RPT bitmap is 1, and transmits one MAC PDU four times.

In vehicle-to-vehicle communication, a cooperative awareness message (CAM) of a periodic message type, a decentralized environmental notification message (DENM) of an event triggered message type, or the like may be transmitted. The CAM may include basic vehicle information including vehicle dynamic status information such as direction and speed, vehicle static data such as dimensions, external lighting conditions, and route history. The size of the CAM may be 50 to 300 bytes. The CAM shall be broadcast and the latency shall be less than 100 ms. The DENM may be a message generated in an unexpected event such as a vehicle malfunction or an accident. The size of the DENM may be less than 3000 bytes, and any vehicle within the transmission range of the message may receive the message. Here, the DENM may have a higher priority than the CAM, wherein having a high priority may mean that a message having a higher priority is prioritized when messages are to be simultaneously transmitted by one UE or that a message having a higher priority among multiple messages is to be transmitted first in temporal order. From the perspective of multiple UEs, a message with a higher priority may be set to be less affected by interference than a message with a lower priority, thereby lowering the probability of reception errors. The CAM may have a larger message size when it includes security overhead than when it does not include the security overhead.

Embodiments

Hereinafter, various embodiments of the present invention relating to partial sensing (hereinafter referred to as P-sensing) will be described based on the above description.

Determination of P-Sensing Resources

A UE according to one embodiment of the present invention may perform sensing on m subframes indicated by higher layer signaling among n subframes in a sensing window. The sensing of the m subframes may be repeated within the sensing window at intervals of the n subframes. Alternatively, the n-subframe interval may be configured by the network. That is, the length of duration of P-sensing may be predetermined or may be signaled by the network over a physical layer or higher layer signal. That is, the sensing (partial sensing) of n subframes is repeated in the sensing window at intervals of m subframes. The higher layer signaling may indicate m corresponding to the minimum number of subframes for performing partial sensing (P-sensing). The length of the P-sensing duration may be the same among the P-UEs. However, the location of an actual subframe in which the sensing is performed may differ among the UEs, and may be different depending on implementation of UEs. A resource selection window continuously starts at the end of the sensing window.

Regarding the sensing method, a P-UE may sense the whole resource region (within the resource pool set for the P-UE to use) to select a P-sensing resource region (a transmission candidate resource region). In this operation, the proportion of occupied resources for estimating the congestion level may be used in selecting the P-sensing resource region. To this end, the P-UE may wake up before selecting the P-sensing resource region and measure the average interference amount (or the aforementioned measurement metric) for the entire resource region for a predetermined time. In this operation, if the P-UE wakes up in all the resource regions and monitors the resource regions, excessive battery consumption may be caused. Accordingly, the P-UE may selectively monitor only some resources in each resource region for P-sensing. In this case, the entire resource sensing of the P-UE may be considered as distributed in the P-sensing resource region. That is, although the entire P-sensing resource region can be monitored, only some of the resources are selectively monitored in each P-sensing resource region in consideration of consumption of the battery of the UE. The UE may selectively perform this operation whenever it attempts to change the P-sensing resource region. This method may facilitate interference control because P-UEs select a P-sensing resource region after monitoring the entire resource regions.

Subsequently, m subframes may be selected from among n subframes in the selection window as transmission resources based on the result of sensing for the m subframes. In the selection of transmission resources, P-sensing resources may be selected by measuring the average/maximum/minimum RSSI/S-RSSI/S-RSRP/PSSCH-RSRP of the P-sensing resource region. The PSSCH may be transmitted through k subframes selected as the transmission resources.

The network may instruct a P-UE to measure the average/maximum/minimum RSSI/S-RSSI/S-RSRP/PSSCH-RSRP of a P-sensing resource region on the partial resource and to report the entirety or part of the measurement to the network. In this case, the UE may transmit the result of sensing for the m subframes to the network for a UE that does not receive the sidelink signal. Specifically, the UE may signal the index of the partial resource which the UE has measured and the measurement value on the P-sensing resource to the eNB over a physical layer or higher layer signal.

Then, the UE that does not receive the sidelink signal may receive, from the network, information that is based on the result of sensing for the m subframes. Thereafter, the UE that does not receive the sidelink signal may determine a transmission-related parameter based on the information received from the network.

That is, a V-UE or a P-UE capable of performing partial sensing measures a congestion level or the like for a UE that does not have a (sidelink) reception capability among the P-UEs. The network may collect the information and signal, to the UE, the average measurement/congestion level of the P-sensing resource region or resource pool over a physical layer or higher layer signal. Such signaling may be periodic or may be provided at the request of the UE. The UE that does not have the sidelink reception capability may use this information to determine transmission parameters such as the size of transmission resources thereof (the RB size, the number of subchannels), transmission power, and MCS. Alternatively, a UE capable of performing P-sensing may use this information to reselect a P-sensing resource region, or may measure the current congestion level to determine how good the level is compared to the average level and use the measured level to perform P-sensing resource reselection (or pool change or carrier change). As a specific example, the network may signal the average congestion level information to the UE over a physical layer or higher layer signal. The P-UE may measure the congestion level in the resource region in which the P-UE performs P-sensing. If the measured level is higher than the average by a predetermined threshold or more, the P-UE may change the P-sensing resource, change all or some of the transmission parameters (MCS, RB size, number of subchannels, power) in the P-sensing resource, or perform transmission by shifting the resource pool to a pool configured for a separate purpose (a pool which is used to perform random resource selection or is exceptionally used).

The P-UE may perform sensing and resource selection operations by randomly selecting some of the resource regions. For example, when resources is divided into N (e.g., N=10) regions, the UE may randomly select one region and perform the sensing operation in the selected region. Here, a rule may be defined such that the P-UE selects a transmission resource only in the selected resource region.

As an example of a random selection scheme, a sensing resource region may be selected based on the ID of the P-UE. A value obtained by performing modular operation on the P-UE ID with N may be configured as a P-sensing resource. This random selection scheme may evenly distribute the P-UEs and level the interference among the P-UEs. However, because a region is randomly selected, UEs may be overcrowded in a certain P-sensing duration. If many V-UEs are distributed to a specific resource region, communication may not be performed smoothly due to the overcrowded state. Therefore, the network may selectively apply the random selection scheme in consideration of the distribution condition of the V-UEs in a specific resource region.

The network may signal, to individual UEs or to a UE group, the times when the P-UE is turned on to perform P-sensing and is turned off not to perform the sensing, over a physical layer or higher layer signal. The network may control all P-UEs. Alternatively, the network may only indicate partitioning of P-UE sensing resources and the UE may select a P-UE sensing resource. The P-UEs in the eNB control mode may perform monitoring and congestion measurement on a P-sensing resource individually indicated by the network and send a corresponding report to the network. Such P-sensing resource region may be operatively connected with a resource reservation period set by the network. For example, when the minimum/maximum available resource reservation period is x, the period of the P-sensing resource region may be determined in operative connection with the resource reservation period.

Change of P-Sensing Resource Region

When the P-UE selects a P-sensing resource region, the P-sensing resource region may be changed due to collision or lack of transmission resources. In this case, the following operations may be considered.

If there is no suitable resource for transmission in the P-sensing resource region, the UE may trigger reselection and/or change the P-sensing resource region. For example, when a resource less than a certain threshold is not found in a specific P-sensing resource region, change of the P-sensing resource region may be triggered. In this case, for selection of a P-sensing resource region, one of the proposed methods for determining a P-sensing resource may be used. Here, the previously selected P-sensing resource region may be excluded from the selection. In addition, if a new P-sensing resource region better than the previous sensing resource region is not found, the P-sensing resource change may not be performed. For this operation, the P-sensing resource change may be performed only when the measurement metric measured in the new P-sensing resource region is smaller/larger than the measurement metric measured in the P-sensing resource region by the sum of certain offsets (or a result obtained by applying a weight) (a smaller RSSI is a better metric, and a smaller unoccupied resource ratio is a better metric). This is intended to prevent excessive P-sensing resource region changes.

A rule may be defined such that, when the counter becomes 0 and resource reselection is triggered, the UE reselects a P-sensing resource region. Alternatively, a counter for changing the P-sensing resource region, which is different from the resource reselection counter, may be introduced, and thus a separate P-sensing resource region change may be performed. In order to synchronize the counter with the resource reselection counter, the P-sensing resource region change counter may be set to a multiple of the resource reselection counter.

In order to change the P-sensing resource region, a rule may be defined such that another P-sensing resource region is pre-monitored. For this operation, once a P-sensing resource region has been selected and resource selection has been performed, monitoring of the selected P-sensing resource region may be unnecessary until the counter becomes zero. At this time, intended monitoring of another P-sensing resource region may be performed. If a better measurement metric is observed in the monitored P-sensing resource region, the P-sensing resource region change may be performed (due to mismatch of RB size, MCS, etc.) at the same time when the counter becomes 0 or resource reselection is triggered.

Alternatively, a rule may be defined such that the UE always monitors the P-sensing resource region that the UE has selected and a P-sensing resource region which is likely to be selected in the future. A rule may be defined such that the UE monitor N P-sensing resource regions beyond two P-sensing resource regions, wherein the number of P-sensing resource regions to be monitored may be signaled by the network or be predetermined. Alternatively, the UE may autonomously determine the number of resource regions in which the UE may be performing P-sensing according to implementation thereof.

In the current LTE Release 14 V2V resource selection, 1000 ms is monitored only when resource (re)selection is performed. Therefore, resource monitoring may not be performed for some time after resource selection is performed once. Similarly, for the P-sensing resource region, after resource selection is performed, only transmission may be performed and separate resource monitoring may not be performed until reselection is performed. At this time, if the P-UE is likely to perform resource (re)selection (if the counter approaches 0 or the resource size becomes insufficient), the P-UE may wake up before a certain time and monitor a P-sensing resource region.

The length of the sensing window of the P-UE may be configured differently from that of the V-UE. The length may be set to be equal to a message generation period of the P-UE. In this case, a UE transmitting a message in a long period among the V-UEs may fail to properly perform sensing, and accordingly the PPPP of the P-UE may always be set higher than that of the V-UE in order to prevent resource collision. Thereby, the V-UE may identify and avoid resources used by the P-UE.

The message generation period of the P-UE may be longer than that of the V-UE. The period during which the P-UE performs the P-sensing should be the minimum message reservation period in the resource pool (which is configured for the P-UE to use) (in order to reduce battery consumption of the UE). This allows the P-UE to monitor and avoid the message of a UE performing transmission with the minimum periodicity. The P-UE divides the resource region into N P-sensing regions. Disclosed below is a method of setting the period of each P-sensing region to be equal to the minimum message generation period in the resource pool.

The network may instruct the P-UE to measure the average/maximum/minimum RSSI/S-RSSI/S-RSRP/PSSCH-RSRP of the P-sensing resource region on a partial resource and to report the entirety or part of the measurement to the network. The UE may signal the index of the partial resource measured by the UE and the measurement value in the P-sensing resource to the eNB over a physical layer or higher layer signal. This operation may also be applied to a V-UE. A V-UE measures a congestion level or the like for a UE that does not have a (sidelink) reception capability among the P-UEs. The network may collect the information and signal, to the UE, the average measurement/ congestion level of the P-sensing resource region over a physical layer or higher layer signal. Such signaling may be periodic or may be provided at the request of the UE. The UE may use this information to reselect a P-sensing resource region, or may measure the current congestion level to determine how good the level is compared to the average level and use the measured level to perform P-sensing resource reselection (or pool change or carrier change).

In one embodiment, the network may signal the average congestion level information to the UE over a physical layer or higher layer signal. The P-UE may measure the congestion level in the resource region in which the P-UE performs P-sensing. If the measured level is higher than the average by a predetermined threshold or more, the P-UE may change the P-sensing resource, change all or some of the transmission parameters (MCS, RB size, number of subchannels, power) in the P-sensing resource, or perform transmission by shifting the resource pool to a pool configured for a separate purpose (a pool which is used to perform random resource selection or is exceptionally used).

Figure 10:
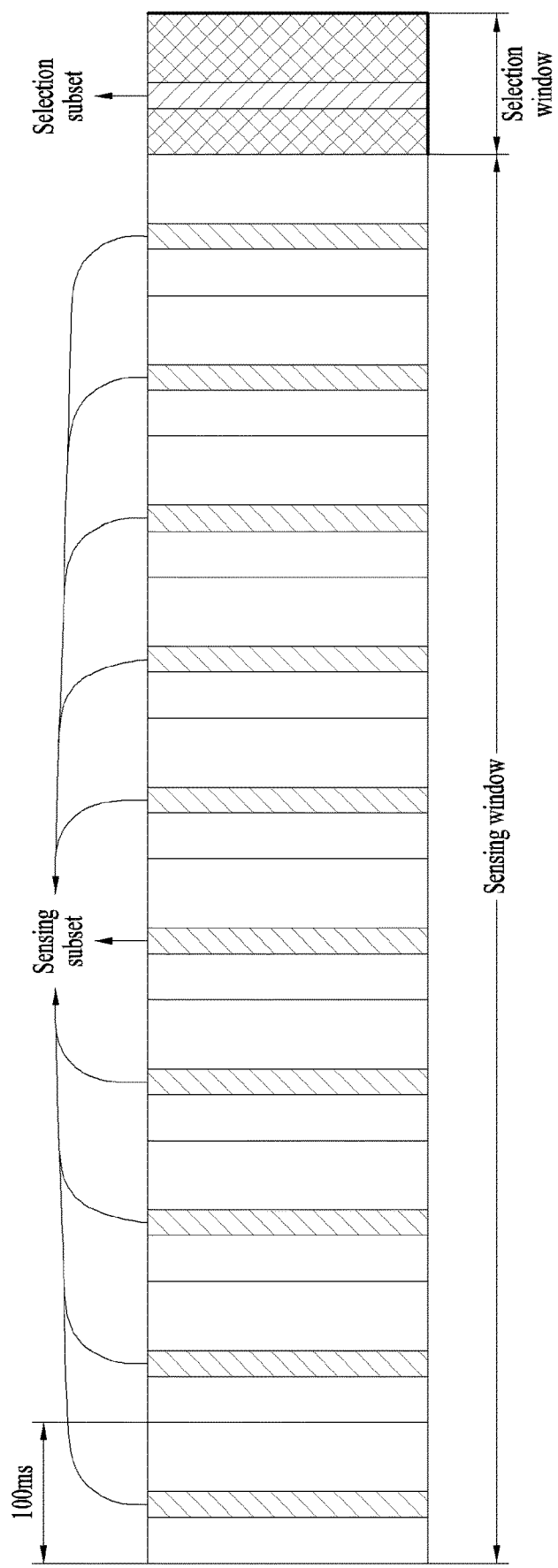
FIG. 10 is a view illustrating an example of the present invention.
Figure 11:
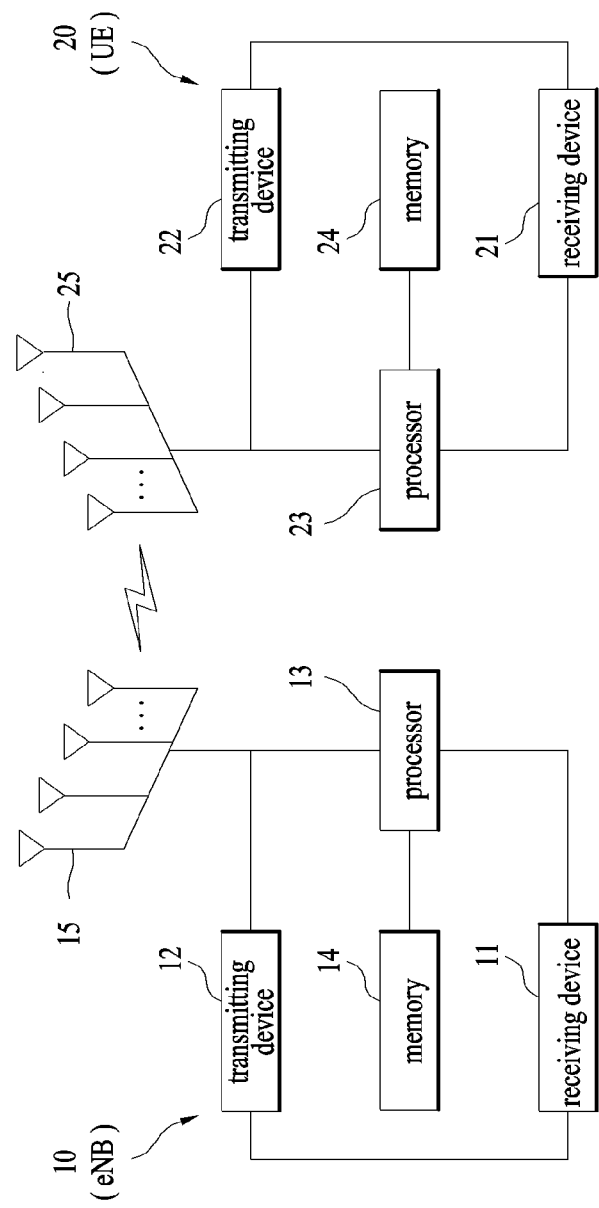
FIG. 11 is a diagram showing a configuration of a transmission apparatus and a reception apparatus.

FIG. 10 shows a specific example based on the description above. Referring to FIG. 11, the P-UE may reduce battery consumption by measuring a limited resource within a sensing window as shown in FIG. 11. The partial sensing resource may be configured by a network. The network may configure multiple resource subsets within the sensing window for partial sensing of the P-UE. Although the configuration of the partial sensing resource subsets should be related to the limits of the I-value related to a configurable reservation period, the partial sensing resource subsets depend on implementation of the network. When multiple resource subsets are configured by the network or configured with an external coverage, the UE may select one or more subsets for partial sensing. Selection of a partial sensing subset/resource/window may be based on random selection or on S-RSSI measurement or congestion level measurement. That is, when multiple resource subsets are configured by the network or configured within a coverage, the UE may select one or more subsets for partial sensing. Selection of the sensing subset may be based on random selection or on S-RSSI or congestion level measurement.

When the UE performs partial sensing, the selection window should be limited by the selected partial sensing subset because the UE does not have any sensing information except the selected partial sensing subset. A change of the partial sensing resource may be triggered if the UE does not find an appropriate resource within the selected partial sensing window, the congestion level exceeds a threshold, or reselection is triggered.

In changing the partial sensing resources, two alternatives may be considered: random selection and sensing/measurement-based selection. For the second alternative, measurement information about other unselected partial sensing resources is needed. Before triggering a change of the partial sensing subset, the UE attempts to measure other resources for potential change of the partial resource. In an agreed V2V sensing operation, the UE does not need to sense resources immediately after resource selection is performed until the resource selection triggers subframe-1000. When the UE performs the partial sensing resource change, one or more partial resource sensing may be performed, but this may cause larger battery consumption of the P-UE. To address this issue, the UE intentionally performs partial sensing of an unselected partial sensing resource immediately after resource (re)selection is performed. In addition, hysteresis may be applied to the partial sensing resource reselection in order not to trigger frequent partial sensing resource changes.

The P-UE may not have a dedicated Rx chain in order to reduce the cost of UE implementation. For the partial sensing resource, the UE may borrow a DL Rx chain from a Uu carrier. The issue of the priority of partial sensing should be discussed. The P-UE may not have a dedicated Tx chain at 5.9 GHz. The Tx chain may be temporally borrowed for P-UE transmission by a ProSe gap.

Meanwhile, the network may signal, to the UE, the size/proportion of a time and/or frequency resource region for P-sensing over a physical layer or higher layer signal. The UE may perform P-sensing and resource selection only in a certain region determined by the UE for the size/ proportion. In this case, a rule may be defined such that the UE does not perform P-sensing/signal transmission so as not to affect important Uu link operations such as paging or UL transmission/reception. A rule may be defined such that the UE does not perform sensing in a subframe region in the paging region, the RAR reception region, or the MIB or SIB monitoring duration. This operation may be limited to UEs sharing the Uu and the reception/transmission circuit. For this operation, a gap may be configured such that reception/ transmission is not performed for a certain period. However, since configuring an SL or DL gap for each UE may increase signaling overhead, configuration of the gap may be determined by implementation of the UE.

In the partial sensing operation, a UE monitors a subset of subframes within the sensing window in order to lower battery consumption. In determining the sensing subframe subset, an influence on the Uu operation needs to be considered. If the P-UE does not have a dedicated RX chain for the partial sensing operation, what is used for DL reception needs to be switched to the PC5 carrier, and thus it is necessary to generate discontinuous DL reception. Since the P-UE is expected to perform sensing of about 10% of the subframes, such uncontrollable DL reception failure may not be acceptable in the Uu operation. Therefore, a DL gap needs to be configured from the network such that the P-UE may perform partial sensing only within this gap and the eNB may avoid DL scheduling in this gap. In this case, the configuration of the DL gap is up to the eNB implementation, and additional specification support such as a method to change the sensing subframe subset may not be needed.

Even if a P-UE has a dedicated RX chain for the partial sensing operation, the chain needs to be turned on and off to lower battery consumption. However, turning on/off the RX chain incurs interruption of the reception operation in other carriers. This makes it difficult to define a rule for determination of a sensing subframe subset. For example, an RRC_Idle UE needs to monitor a paging occasion thereof but it may cause a problem of interrupting the paging reception if the PC5 RX chain is turned on/off. If a solution to avoid such a problem cannot be easily found, how to determine the exact subframe subset may be up to UE implementation under the condition that the partial sensing operation shall not interrupt important Uu operations such as monitoring paging occasion. In this case, the eNB may provide guidelines on the partial sensing operation such as the minimum number of subframes to be sensed before resource selection.

In summary, when a P-UE can perform partial sensing with an RX chain shared with DL reception, configuration of a DL gap is needed to allow the RX chain to switch to the PC5 carrier. Determination of a sensing subframe subset may be up to UE implementation under the condition that the partial sensing operation shall not interrupt important Uu operations such as monitoring paging occasion. The eNB may provide guidelines on the partial sensing operation such as the minimum number of subframes to be sensed before resource selection.

Regarding how to determine a subset of subframes for candidates of resource selection and how to relate this with the sensing subframe subset, RAN1 #86 has made the following agreement on handling the case where a UE skips the monitoring operation in some subframes. The UE shall exclude subframe #y within the selection window thereof if subframe #(y+P*j) can overlap with subframe #(k+100), where P is a resource reservation interval of the UE, j is 0, 1, . . . , C_resel-1, and i is any (available) elements in the set restricted by carrier-specific network (pre)configuration.

Basically, this agreement means that, once a subframe is not monitored, any subframe that may collide with a subframe potentially reserved by an SCI transmitted in that subframe shall be excluded from the resource selection. This is sufficient to describe how to determine a subset of subframes for the candidates of resource selection, and no additional behavior is needed. In other words, the agreement in RAN1 #86bis may apply to any case where a monitoring subframe is skipped irrespective of the reason for skipping (e.g., half duplex issue, battery saving, etc.). In summary, RAN1 #86bis agreements on handling monitoring subframe skipping may be reused to determine the subset of subframes for the candidates of the partial sensing-based resource selection.

Regarding how to specify the partial sensing operation, the foregoing description suggests that the partial sensing operation can be supported by introducing a "power saving version of sidelink mode 4." If (pre-)configuration allows the power saving operation in a resource pool configured for mode 4, the UEs may perform the partial sensing operation. It should be noted that this power saving operation may be allowed only for P-UEs, and V-UEs using the same resource pool may be forced to perform the full monitoring operation. When the eNB allows partial sensing in a mode 4 resource pool, it may provide the minimum number of subframes to be sensed in the sensing window. This provision may be based on the tradeoff between the power consumption and PRR performance.

Each P-UE may determine the exact subset of sensing subframes according to implementation thereof under the constraints that i) the number of sensed subframes in each sensing window shall be larger than or equal to the minimum number configured by the eNB and that ii) the partial sensing operation shall not interrupt important Uu operations such as monitoring paging occasion.

Regarding the period of the sensing window used by a P-UE, it is proposed that (partial) sensing be performed only at a multiple of the minimum value of a resource reservation period allowed in the resource region used by the P-UE. In this way, the P-UE does not need to sense a resource region every 100 ms. When a specific UE attempts to select a resource in subframe n+x, the UE will perform sensing only in subframe n+x−M, where M is a multiple of the minimum value of the resource reservation period allowed in the resource region, and affect the current resource selection only in the corresponding subframes. Accordingly, battery consumption of the P-UE may be further reduced.

In a selected subframe, a physical sidelink control channel (PSCCH) may be transmitted together with, namely, FDMed with, a PSSCH. In the subframes used by UE2, the PSCCH of UE2 may be transmitted, and the PSSCH may be transmitted through FDM. The above-described operation may be performed by any UE or the measurement operation may be limited to a specific UE.

The descriptions above are not limited to direct communication between UEs but may also be used on uplink or downlink. In this case, an eNB or a relay node may use the above-described method.

It is apparent that examples of the proposed scheme described above may also be included as one of the implementation methods of the present invention, and thus may be regarded as a kind of proposed schemes. In addition, the proposed schemes described above may be implemented independently or in combination (or merge) of some of the proposed schemes. The information on whether or not the proposed methods are applicable (or information on the rules of the proposed methods) may be defined such that the base station shall deliver the information to the UE over a predefined signal (e.g., a physical layer signal or a higher layer signal).

Device configuration according to embodiments of the present invention

FIG. 11 is a diagram showing a configuration of a transmission point apparatus and a UE according to an embodiment of the present invention.

Referring to FIG. 11, a transmission point apparatus 10 may include a receiver 11, a transmitter 12, a processor 13, a memory 14, and a plurality of antennas 15. The plurality of antennas 15 represents the transmission point apparatus supporting MIMO transmission/reception. The receiver 11 may receive various kinds of signals, data and information on the uplink from the UE. The transmitter 12 may transmit various kinds signals, data and information on the downlink to the UE. The processor 13 may control overall operation of the transmission point apparatus 10.

The processor 13 of the transmission point apparatus 10 according to one embodiment may process necessary details in each of the above-described embodiments.

The processor 13 of the transmission point apparatus 10 may also perform a function of computationally processing information received by the transmission point apparatus 10 and information to be transmitted to the outside, and the memory 14 may store the computationally processed information and the like for a predetermined time, and may be replaced by a component such as a buffer (not shown).

Next, referring to FIG. 11, a UE 20 may include a receiver 21, a transmitter 22, a processor 23, a memory 24, and a plurality of antennas 25 have. The plurality of antennas 25 represents the UE supporting MIMO transmission/reception. The receiver 21 may receive various kinds of signals, data and information on the downlink from a base station. The transmitter 22 may transmit various kinds of signals, data and information on the uplink to the base station. The processor 23 may control overall operation of the UE 20.

The processor 23 of the UE 20 according to one embodiment may process necessary details in each of the above-described embodiments. Specifically, after the processor excludes subframes used by UE2 from the candidate subframes for PSSCH transmission, the processor may select a subframe to use to transmit the PSSCH and transmit the PSSCH through the transmitter. The subframes used by UE2 may include subframes whish are assumed to be repeatedly used by UE2 according to a reservation period of UE2. If the reservation period of UE2 is less than a predetermined value, the number of subframes assumed to be repeatedly used may increase as the reservation period of UE2 becomes shorter.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 11, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method for transmitting, by a user equipment (UE), a physical sidelink shared channel (PSSCH) in a wireless communication system, the method comprising:
Performing a sensing for first m subframes among n subframes in a sensing window;
repeating the sensing in the sensing window at intervals of n subframes;
based on the sensing in the sensing window, selecting a subframe from among second m subframes corresponding to the first m subframes in a selection window; and
transmitting the PSSCH through the selected subframe,
wherein a minimum value related to m is indicated by higher layer signaling and the UE determines the second m subframes based on the minimum value.

2. The method according to claim 1, wherein m is smaller than n.

3. The method according to claim 1, wherein the result of the sensing of the first m subframes is transmitted to a network for a UE that does not receive a side link signal.

4. The method according to claim 3, wherein the UE that does not receive the sidelink signal receives, from the network, information which is based on the result of the sensing for the first m subframes.

5. The method according to claim 4, wherein the UE that does not receive the sidelink signal determines a PSSCH transmission-related parameter based on the information received from the network.

6. The method according to claim 1, wherein the UE is a pedestrian UE (P-UE).

7. The method according to claim 1, wherein the selection window continuously starts at an end of the sensing window.

8. A user equipment (UE) for transmitting a physical sidelink shared channel (PSSCH) in a wireless communication system, the UE comprising:
a transmitter and a receiver; and
a processor,
wherein the processor is configured to:
perform a sensing for first m subframes among n subframes in a sensing window,
repeat the sensing in the sensing window at intervals of n subframes,
based on the sensing in the sensing window, select a subframe from among second m subframes corresponding to the first m subframes in a selection window, and
transmit the PSSCH through the selected subframe,
wherein a minimum value related to m is indicated by higher layer signaling and the UE determines the second m subframes based on the minimum value.

9. The UE according to claim 8, wherein m is smaller than n.

10. The UE according to claim 8, wherein the result of the sensing of the first m subframes is transmitted to a network for a UE that does not receive a side link signal.

11. The UE according to claim 10, wherein the UE that does not receive the sidelink signal receives, from the network, information which is based on the result of the sensing of the first m subframes.

12. The UE according to claim 11, wherein the UE that does not receive the sidelink signal determines a PSSCH transmission-related parameter based on the information received from the network.

13. The UE according to claim 8, wherein the UE is a pedestrian UE (P-UE).

14. The UE according to claim 8, wherein the selection window continuously starts at an end of the sensing window.

* * * * *